April 12, 1955 H. C. A. VAN DUUREN 2,706,215

MNEMONIC SYSTEM FOR TELEGRAPH SYSTEMS AND LIKE APPARATUS

Filed March 24, 1950 4 Sheets-Sheet 1

INVENTOR.
Hendrik Cornelis Anthony van Duuren

BY [signature]

[signature]

ATTYS.

MNEMONIC SYSTEM FOR TELEGRAPH SYSTEMS AND LIKE APPARATUS

Filed March 24, 1950 4 Sheets-Sheet 2

INVENTOR.
Hendrik Cornelis Anthony van Duuren
BY Morris, Jackson, Boettcher & Dienner
ATTYS

MNEMONIC SYSTEM FOR TELEGRAPH SYSTEMS AND LIKE APPARATUS

Filed March 24, 1950 4 Sheets-Sheet 3

INVENTOR.
Hendrik Cornelis Anthony van Duuren
BY Brown, Jackson, Boettcher & Dienner
ATTYS.

| | MURRAY CODE 12345 | | CONVERTED SIGNAL 1234567 |
|---|---|---|---|
| a | XXOOO | | XXOOOOX |
| b | XOOXX | | XXXOOOO |
| c | OXXXO | | OOXXOXO |
| d | XOOXO | | XOOXXOO |
| e | XOOOO | | XOOXOOX |
| f | XOXXO | | XOXOXOO |
| g | OXOXX | | OOXXOOX |
| h | OOXOX | | OOXOXOX |
| i | OXXOO | | OXXOOXO |
| j | XXOXO | | XXOOXOO |
| k | XXXXO | | XOOOOXX |
| l | OXOOX | | OXOOXOX |
| m | OOXXX | | OXOXOOX |
| n | OOXXO | | OOXOOXX |
| o | OOOXX | | OXXOOOX |
| p | OXXOX | | OXOXOXO |
| q | XXXOX | | XOOOXOX |
| r | OXOXO | | OXOOOXX |
| s | XOXOO | | XOXOOOX |
| t | OOOOX | | OOOXXOX |
| u | XXXOO | | XOOOXXO |
| v | OXXXX | | OOOOXXX |
| w | XXOOX | | XXOOOXO |
| x | XOXXX | | XXOXOOO |
| y | XOXOX | | XOXOOXO |
| z | XOOOX | | XOOXOXO |
| carr. return | OOOXO | | OOOXOXX |
| line feed | OXOOO | | OXOOXXO |
| figures | XXOXX | | XOXXOOO |
| letters | XXXXX | | OXXXOOO |
| space | OOXOO | | OOXOXXO |
| unp. tape | OOOOO | | OOOXXXO |
| | | warn. signal | OOXXXOO |

FIG. 4

INVENTOR.
Hendrik Cornelis Anthony van Duuren
BY Brown, Jackson, Boettcher & Dienner
ATTYS.

2,706,215
Patented Apr. 12, 1955

2,706,215

MNEMONIC SYSTEM FOR TELEGRAPH SYSTEMS AND LIKE APPARATUS

Hendrik Cornelis Anthony van Duuren, Wassenaar, Netherlands, assignor to Staatsbedrijf der Posterijen Telegrafie en Telefonie, The Hague, Netherlands Application March 24, 1950, Serial No. 151,577

12 Claims. (Cl. 178—2)

Figure 1:
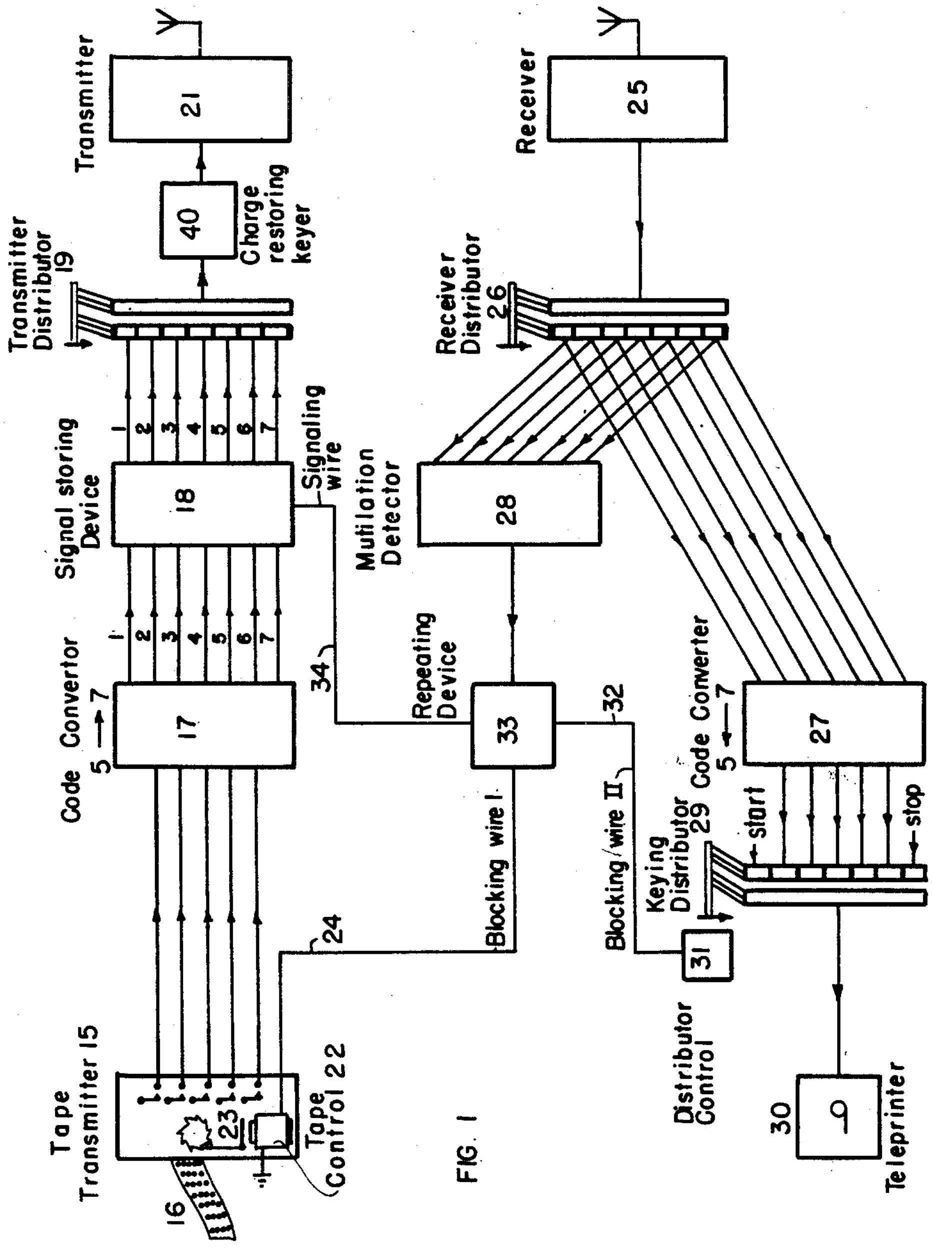

The present invention relates, in general, to a novel mnemonic system which is adapted for use in a radio telegraph system.

The invention has primary utility in connection with radio or wire signal transmission systems of the general type which was disclosed in U. S. Patent Nos. 2,279,353 and 2,313,980 which were issued to H. C. A. van Duuren on April 14, 1942 and March 16, 1943, respectively.

The use of equal length telegraph codes, that is, codes in which each of the signals transmitted is represented by the same number of elements, has become well established in the field. Of these equal length codes, the five element Baudot code seems to be the most commonly accepted, inasmuch as a limited number of elements is required to effect signal representation, and increased efficiency in message transmission is accomplished. In the use of this code in wireless transmission however, such advantage is offset by the susceptibility of the signals to transposition in transmission. It has become common practice, therefore, to employ specially developed apparatus known in the field as "code converting equipment" to transform the signals, for transmission purposes, into signals of the constant ratio type, or of any other type having a number of marking and spacing elements which may be readily checked at the incoming path for a station. Scanning apparatus in the receiver equipment is operative to examine each signal as received, and checks the number of marking and spacing elements therein as a check for possible element mutilation.

The advantages of error detecting equipment are more fully appreciated whenever some useful reconstruction of a mutilated message is accomplished as detected, and it has, therefore, become a somewhat general practice to provide such equipment in telegraphy systems. In the patents mentioned above, for example, the receiving equipment at a station is operated on detection of a mutilated signal by its associated detector to send a warning signal to the station, from which the message was received, and signal warning responsive to equipment thereat is operative to cause such unit to terminate its signal transmitting operation to effect a predetermined restep of the perforated strip at the transmitter, and to reoperate the tape in a forward direction whereby a given number of the signals including the signal which was mutilated will be retransmitted.

One of the principal objects of the present invention is to provide an improved system in which this backward movement of the tape is eliminated, and in which the tape movement is merely interrupted when a request for signal repetition is received. A system of this general type has been disclosed in the copending Van Duuren patent application, Serial No. 2,435 which was filed January 15, 1948.

In such system a group of five auxiliary relays is controlled by movement of the perforated tape to control a group of seven code converting relays to transmit a seven element signal. A signal storing or collecting arrangement comprising five groups of five condensers is arranged to store five successive signals as they are received by the auxiliary relays from the perforated tape. Whenever a repeat request signal is received to indicate that a signal was mutilated in transmission, the tape is stopped, and the condenser groups are successively connected to the auxiliary relays to effect reoperation of the auxiliary relays and code converter relays to retransmit the signals stored thereon in the manner of their initial transmission.

In such arrangement, the time delay which occurs between the emission of a letter and the actuation of the repeating mechanism by a warning signal requesting this repetition is, at most, equal to the transmission interval for a single signal (approximately 140 milliseconds). A certain amount of further propagation delay is effected, however, in reoperating the auxiliary relay set, the connection of the storage condenser set to the code converting relay set, and the consequent operation of the code converting relay set.

Application No. 2435 by H. C. A. van Duuren teaches the connection of a mnemonic device for the transmitter in sequence prior to the signal convertor which converts 5 unit signals into 7 unit signals. Accordingly, the mnemonic system therein comprises three sets of five condensers for storing the last three of the signals emitted via the code-convertor input relays. Three sets of condensers are provided as the time delay elapsing between the emission of a letter and the actuation of the repeating mechanism by an RQ signal requesting its repetition is, with actual terrestrial propagation delays, at most 140 m. s.

It is, therefore, an object of the invention to provide a more expeditious and flexible type signal storage arrangement in which repetitive signals may be transmitted without requiring reoperation of the various aforedescribed components signal transmitting equipment.

According to the present invention, the desired object is attained by connecting a signal storing device between the output side of the code convertor and the transmitting equipment at the station. Thus, the repetition of a signal will not require operation of a series of auxiliary relays and code convertor relays by the condenser storage units in the manner of the previous arrangements, and the propagation delay is minimized substantially.

According to a feature of the invention, the signal elements to be transmitted with receipt of a request are stored on condenser groups, the signals being sequentially applied as voltages by way of a distributor as a repeat signal as received to a voltage restoring keyer, which is operative to transmit the signals provided by the condensers, and simultaneously restore the signals to the condensers for further use in the event that the second transmission is also mutilated.

Specifically, the distributor supplies the signals on a condenser group to a charge restoring keyer, which on actuation by a condenser charge of a given sign operates to transmit a corresponding voltage over an output circuit and to simultaneously restore the charge to the capacitor having actuated the charge restoring keyer with a voltage of identical sign. A first relay control connection of the condenser groups to the strip keyer, and a set of control relays to control connection of the condenser groups to the distribution as a repeat signal is received.

According to another feature of the invention, the charge restoring keyer basically comprises a flip-flop circuit, the output from the sequential distributor being connected to a control point of this flip-flop circuit so that a voltage of one polarity actuates same from the flip to the flop position, and a voltage of opposite polarity actuates the circuit from the flop to the flip position. In the illustrated arrangement, the flip flop circuit generates a signal in the outgoing path which is of the same polarity as the signal which controlled the operation thereof.

It is obvious that, in addition to resulting in a circuit arrangement of somewhat increased operating speed, the new circuit arrangement is considerably more simplex in structure than the previously known types, and accordingly, the possibility of faulty circuit operation is substantially minimized.

That is, in the transmission of signals in the conventional five element Murray code, thirty-two signals are used, whereas in the constant ratio code wherein each signal comprises seven elements, three of which are marked, there will be thirty-five signals. Accordingly, three signals remain in the second code which cannot be translated by the code convertor. It is, of course, apparent that in arrangements wherein the signal storing device is connected between the code convertor and the punch strip keyer, extra equipment is required to store these three additional signals. In the present arrangement, however, in which the signal storing device is connected at the output side of the code convertor, the three extra signals, which are preferably to be used as warning signals, can be stored in the signal storage device.

The invention will be more clearly understood by reference to the accompanying drawings which include a schematic illustration of one of the systems with which the mnemonic apparatus is utilized and a detailed disclosure of the mnemonic apparatus according to the invention. With reference to Figure 1, there is shown thereat an equipment set which may be located at each of the stations of the systems, two identical sets of equipment as shown in Figure 1 forming a complete telegraph system in which simultaneous traffic may be transmitted in both directions. The transmitting equipment basically comprises a tape transmitter 15, which is operative to scan the signals registered on an associate tape member 16, and to transmit the signal of the coded punches as scanned over conductors 1–5 to a 5–7 element code convertor 17.

Code convertor 17 is operative to automatically convert each five element signal fed thereto into a monitorable seven element signal, and to transmit the seven elements of the converted signal over a signal storing device 18 and conductors 1–7 inclusive to a transmitter distributor unit 19. A scanner ring 10 of the transmitter distributor 19 scans the elements of the signal on the conductor and transmits same via the interconnected charge restoring keyer 40 to the electronic transmitter 21 for transmission to the associated distant station. According to a feature of the invention, each signal transmitted by the transmitter 21 is stored upon the signal storing device 18 for a predetermined period of time after the transmission thereof.

In brief detail, the tape member 16 upon which the signals are punched is advanced over the scanning equipment of the tape transmitter 15 by associated tape control means 22, which may include a conventional stepping magnet and a ratchet assembly 23, as conventionally known in the art. A blocking wire 24 is connected to extend operating potential to the stepping magnet during the normal transmission of the signals, and is operative to interrupt such potential supply with the detection of a mutilated signal or the receipt of a warning signal from the distant end, as will be shown in more detail hereinafter.

The signal as scanned by unit 15 is applied to the code convertor 17, which may be of the type set forth in Patent No. 2,518,405, which was filed January 15, 1948 by Hendrik C. A. van Duuren, and which is operative to convert the five element signal to a monitorable seven element signal.

The seven elements of the converted signal are extended over conductors 1–7 to the signal storing device 18 of the invention, and to the transmitter distributor 19 via the charge restoring keyer 40 for transmission to the distant station by the transmitter 21.

The receiving equipment of each station comprises a receiver unit 25 for receiving the incoming seven element signals from the transmitter at the remote station, and distributes the seven element signals over the receiver distributor 26 to a 7–5 element code convertor 27 and a mutilation detector 28. The code convertor 27 translates the seven element signals into the five element Murray code and transmits the five element signals to the scanner ring of the keying distributor 29 for transmission to an interconnected teleprinter unit 30 of conventional construction.

The keying distributor 29 is operatively controlled by an associated distributor control 31, which is connected to and operated by the mutilation detector equipment conductor 32, with detection of a mutilated signal or warning signal, to block the keying distributor 29 for a time duration equivalent to the following four signal periods so that no printing is effected by the teleprinter 30 during the next four signal periods.

The mutilation detector 28 is operative to scan each signal received and to test same for the preassigned constant ratio. The detector issues a warning with the detection of a signal which does not have the given ratio, and also responds to the receipt of a special constant ratio signal (warning signal) which indicates that a mutilated signal was received by the other station. The warning signal is transmitted to repeating device 33, and then over conductor 34 to control the transmitting equipment to send a warning signal, followed by the three signals which are stored in the signal storing device 18, to the other station. Repeating device 33 simultaneously interrupts the energizing circuits extending over the blocking wires 24 and 32 to effect the temporary arrestment of the operation of the tape control unit 22 and the distributor control unit 31 until such time as four signal periods have expired.

Figure 2:
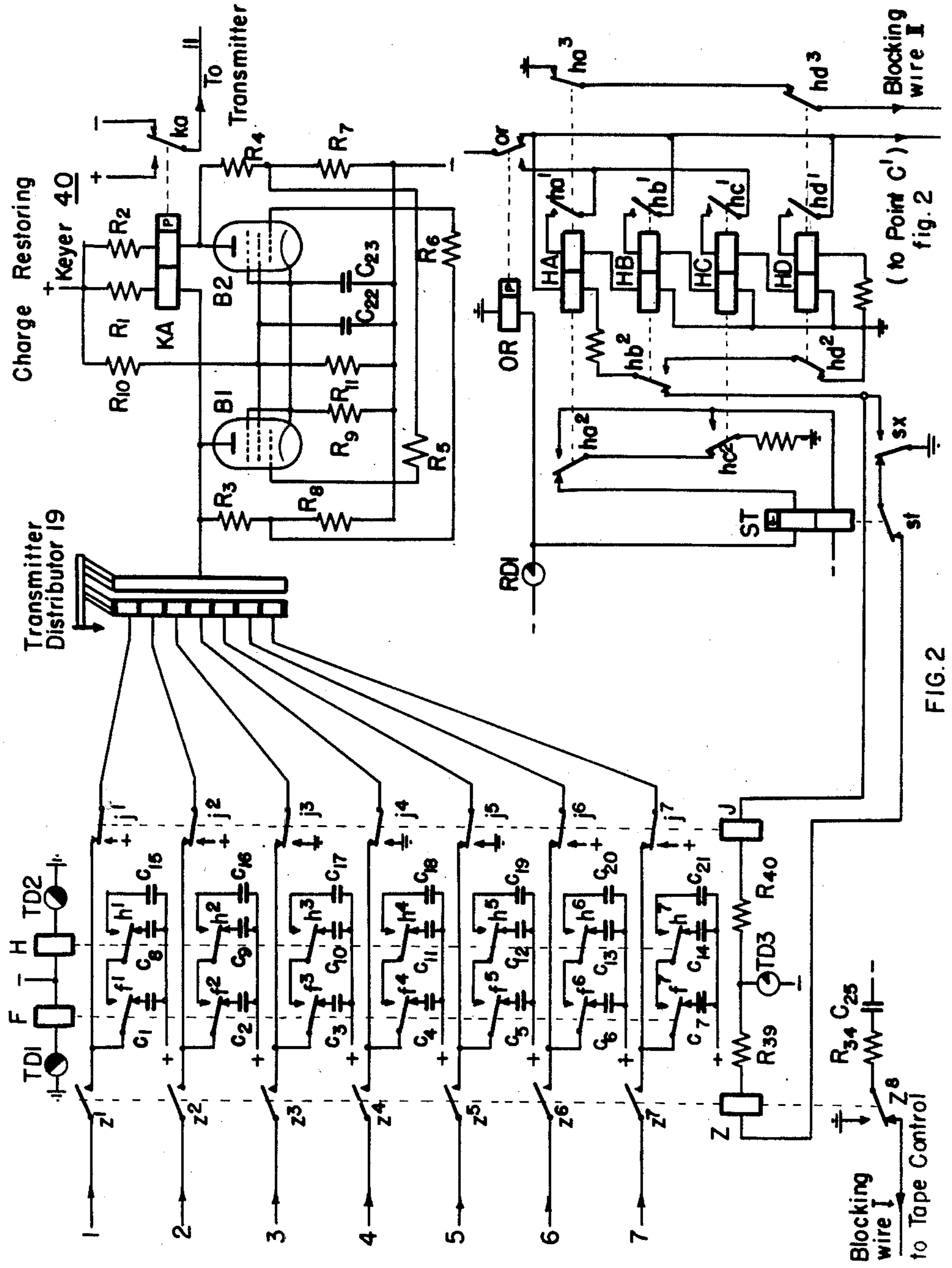

The storage arrangement 18, as shown on Figure 2, comprises three condenser groups, C1–C7, C8–C14 and C15–C21, each of which groups includes seven condensers. The first condenser of each group is associated with the first one of the seven conductors 1–7, the second condenser is associated with the second conductor of the conductors 1–7, etc. The conductors 1–7 are connected to the capacitor groups in sequence by cyclically operated relay contacts 31–37, and periodically operated contacts *f*1–*f*7 and *h*1–*h*7. The conductors 1–7 and condenser groups are also arranged to be connected over the back contacts *j*1–*j*7 of relay J to the transmitter distributor 19.

The relays F and H are operated sequentially to effect connection of the condenser groups to the conductor in a predetermined sequence; that is, the first group of seven condensers C1–C7 are connected to the respective conductors 1–7 with receipt of the first signal over contacts Z1–Z7, relays F and H being restored to effect such connection. With the receipt of the second signal, the first group of condensers C1–C7 is disconnected from the conductors, and the second group of condensers C8–C15 is connected thereto, such arrangement being accomplished by the energization of relay F and the maintenance of relay H in the restored condition. With the receipt of a third signal, relay H is operated, and the third group of condensers C15–C21 is connected to conductors 1–7. With receipt of the fourth signal, relays F and H are again restored, and the first group of condenser C1–C7 is once more connected to the conductors 1–7. The relays F and H are controlled in their cyclic operation by distributor contacts TD1 and TD2 which are fixed on a shaft which rotates at one third of the speed of the shaft which carries contact TD3 for operatively controlling relays Z and J. The latter shaft is stopped whenever repetition of a signal is required as will be shown hereinafter.

The seven conductors are arranged to be extended from the signal storing unit 18 by contacts J1–J7 to the individual contacts on the input side of the scanning or distributor device 19. Thus, as a seven element signal produced by the code convertor 17 is applied to conductors 1–7, and the relay Z operates to close contacts Z1–Z7, the signal is impressed simultaneously upon the contacts of the distributor as well as upon the particular group of storing condensers which is connected at the time.

The distributor 19 has its distributor arm connected to a charge restoring keyer 40, which controls an associated signalling relay KA in the transmission of marking and spacing voltages to the transmitter over conductor 11, the signal transmitted in the present arrangement being of like nature as the signal supplied thereto by the distributor. The charge restoring keyer 40 basically comprises two tubes, B1 and B2, a control circuit connected to the wiper of transmitter distributor 19 for controlling the condition of operation of the two tubes, and a signalling relay KA connected in the output circuit of the tubes B1 and B2. The signalling relay KA takes either one of two stable conditions in accordance with the conductive condition of either one of the tubes, and as its associated contacts KA is arranged to apply positive or negative voltage to the outgoing conductor 11, to thereby provide marking or spacing voltages in accordance with the nature of the successive signals which are supplied to the charge restoring keyer by the transmitter distributor or scanner 19.

As an example, assume that the transmitter distributor 19 extends a negative signal from capacitor C1 as connected thereto, the potential divider R3—R8 will supply a proportionate potential of reduced value over resistor R6 to the control grid of tube B2. In that the signals are of negative calue, the conductivity of the tube is accordingly reduced to the point where the anode thereof becomes positive (nearly battery potential). With the corresponding increase in the value in potential at the anode of tube B2, a signal is transmitted via voltage divider R4—R7 over resistor R5 to the control grid of tube B1, which signal being positive in nature renders the tube B1 conductive, whereby a corresponding drop in the value of potential in the anode of tube B1 is effected.

Relay KA, which is of the polarized type, has its armature *ka* kept at minus battery in that much more current flows through its left hand winding than through its differentially wound right hand winding. Due to the stable condition thus obtained by the cross-wise coupled tubes B1 and B2, the condenser (in the illustrated example, condenser C1) causing this condition is recharged negative (the signal it had impressed thereon as it was connected to the distributor) as it takes the potential of the anode of conducting tube B1, which is assumed to be at ground potential or thereabout. In the event that the signal on conductor 1, as connected by transmitter distributor 19, is a positive signal (condenser C1 in the uncharged state), the anode of tube B1 will be rendered positive if it is in the conducting state as the signal is received (or will remain positive if it was in the nonconducting state as the signal was received). Tube B2 is now rendered conductive by the signal as applied over the voltage dividers R3—R8. With tube B2 conducting, and tube B1 nonconducting, relay K changes its position to apply positive battery to outgoing conductor 11. The tubes are interlocked in this condition until such time as a subsequent signal is received.

The screen grids of the keyer tubes B1 and B2 are biased by the voltage divider R10—R11, the arrangement being decoupled by capacitor C22. The tube cathode supply is obtained over resistor R9, the arrangement being decoupled by capacitor C23. Resistors R1 and R2 are connected with the first and second windings of relay KA in the anode circuits of tubes B1 and B2 respectively.

Signal relay KA is operated between two positions to effect the application of negative and positive signals to conductor 11 which correspond to the signals input to the charge restoring keyer 40.

Before each revolution of the wiper of the transmitter distributor 19, a fresh signal is laid on the distributor by contacts Z1–Z7. Every time the signals are laid on one of the coindenser groups C1–C7, C8–C14 or C15–C21 are charged, depending upon which one of the group is connected to conductors 1–7 during the time interval that relay contacts Z1–Z7 are closed. The action of the contacts Z1–Z7 is effected between two successive cycles of the wiper by connecting the successive sectors of distributor rings 10. The voltages applied at outgoing conductor 11 by the contact RA of polarized relay KA need not be identical with those applied to conductors 1–7, it only being necessary that the alteration in time should correspond with the information applied to the conductors.

It is apparent that as the new set of signals applied to conductors 1–7 are applied to a group of condensers such as C1–C7 which have thereon a set of signals imposed upon a previous cycle, such capacitors maintain their original charge. In such cases where the signals are different, the condensers are charged to the new polarity. Thus, in cyclical succession, previous transmitted signals stored on the condensers are wiped out by the newly applied signals. The period of endurance of a charge in normal cyclic operation of the equipment is therefor the time interval in which three signals are transmitted.

It is obvious in the event that two condensers associated with two successively connected conductors, as for example, condensers C1 and C2 of group 2 are charged with an identical potential sign, the tube arrangement comprised of tubes B1 and B2 in the charge restoring keyer 40, will maintain its energized condition with connection of the subsequent scanner contact thereto, and the second capacitor will likewise retain the charge originally thereon.

In the even that a warning signal is received as a result of the reception of the mutilated signal by a receiver of the station cooperating with the transmitting station illustrated, the last three signals transmitted on the three groups of capacitors are applied to the transmitter distributor and are transmitted by the charge restoring keyer 40 over outgoing conductor 11. If no further warning signals are received, a set of fresh signals are applied to the condensers in the normal manner.

In the event that the three signals upon the three condenser groups have been transmitted as a result of a warning signal, and another warning signal is received as a result of the mutilation of the first of the three signals transmitted, the same three signals are again transmitted, and the storage condensers are recharged as before. This action is repeated until the signal is transmitted correctly, at which time a set of new signals are applied to conductors 1–7, and relay Z operates at its contacts Z1–Z7 to apply a fresh set of signals to the transmitter distributor 19 and the connected one of the condenser groups to thereby wipe off the signals previously stored thereon.

Briefly, in the event that a warning signal is received, the contacts Z1–Z7 are held open, and the punch strip keyer which supplies the signals to be transmitted is blocked. Relay J is operated, and a warning signal is transmitted as indicated in Figure 2 as a result of the closure of the lower contacts at J1–J7. Thereafter relay J is restored and relays F and H are operated to apply the first, second and third signals stored upon the condenser groups to the transmitter distributor 19 for transmission. In the event that no further warning signal is received, a new set of signals is applied to the capacitor, and the repetition cycle is completed.

The manner in which the storage device 18 is controlled to supply the signals stored thereon for transmission to the remote station with the detection of a mutilated or warning signal by the local receiver distributor 26 will now be set forth hereat.

Figure 3:
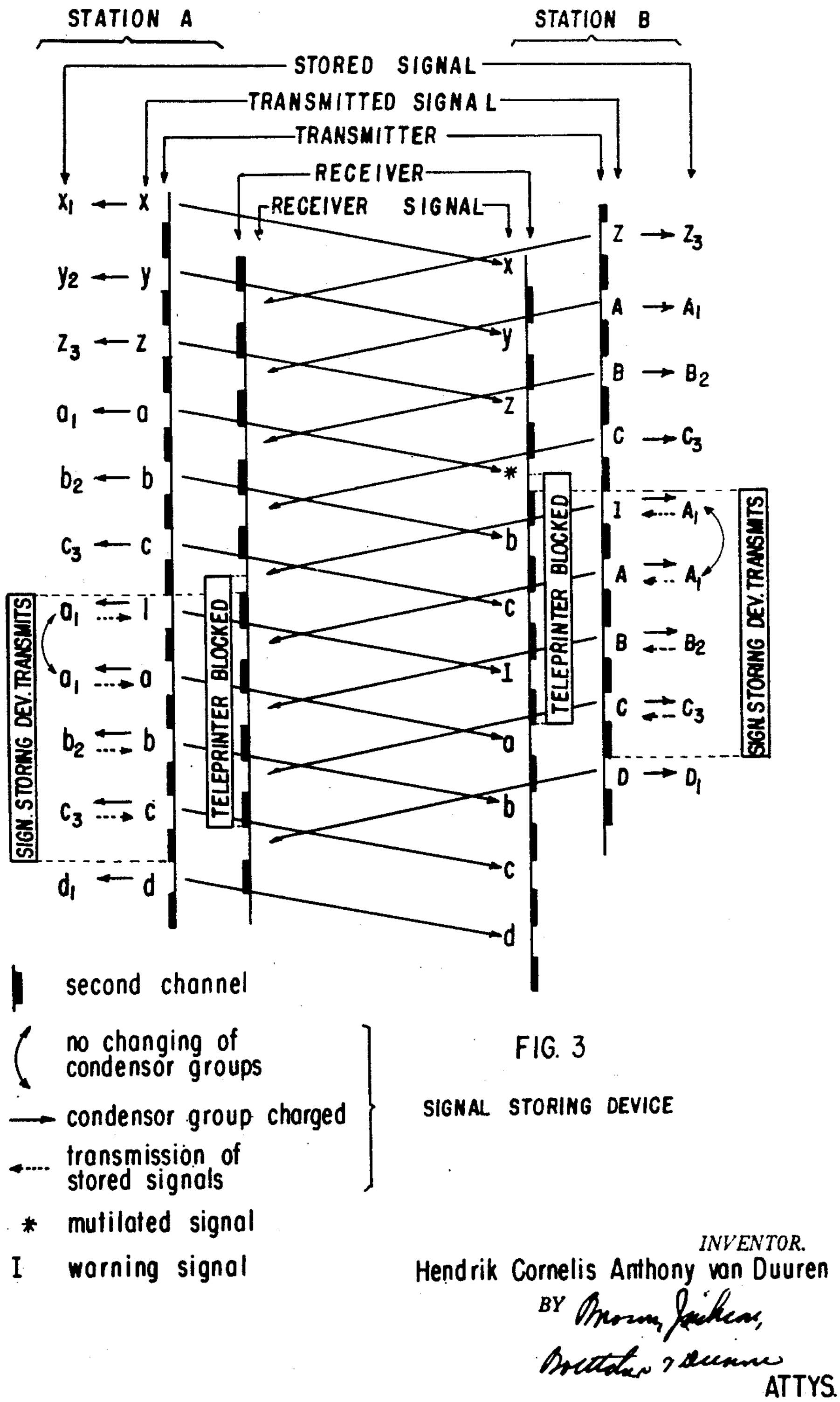

With reference to Figure 1, it will be recalled that as each signal is received from the remote station by receiver 25, it is simultaneously transmitted to the 7–5 code converter 27 and the mutilation detector 28. The mutilation detector 28 may be one of several embodiments wherein a normally inoperative relay SX is operated only responsive to the detection of a warning signal or of a mutilated signal by the detector equipment. One detection embodiment is shown in Figure 3 of Patent No. 2,313,980 which issued March 16, 1953. A further embodiment is also set forth in a copending application of Hendrik C. A. van Duuren which is entitled "Error Detector for Telegraph Printer Codes" which was filed March 15, 1949 and received Serial No. 81,572. The structure set forth in this latter application is directed to an arrangement for detecting errors in eight element signals, it being understood however, that modification of the storage unit of the present invention for use therewith is within the scope of the present invention.

With reference to Figure 2, it is apparent that the contacts *sx* of relay SX are connected to control the operating circuit for control relays Z and J, the relay SX in its restored position being normally effective to extend operating ground to control relay Z, whereby an operating circuit is completed at timed intervals by the cam TD3 in its rotation. Relay Z is effective in its pulsing operation to control the tape control unit 22 to effect advancement of the tape, following extension of each previous signal to the storage device 18 and the transmitter unit 21. With each energization of relay Z, it is effective at its make contact to complete a charging circuit for condenser C25 and with each restoration of relay Z, the charge stored on C25 during the period that relay Z is energized, is transmitted over blocking wire 24 to effect the energization of the tape control equipment 22 and the furthr advancement of tape member 16. Relay J is, of course, in the restored condition during normal transmission.

With the detection of a mutilated signal or a warning signal by the mutilation detector equipment 28, and the corresponding operation of the relay SX, contacts *sx* are operated to interrupt the energizing circuit for the relay Z to prevent further operation thereof by the cam TD3. As shown hereinafter, contacts *st* are opened immediately thereafter to effect, with contacts *sx*, the arrestment of operation of relay Z for a period of time which is equivalent to the time required to transmit four signal elements.

Relay SX at its front contacts *sx* prepares an operating circuit for relay J which is intermittently completed by cam TD3 in its rotation to effect a pulsing operation of relay J. Thus, at this time, the connection between the input of storage device 19 and the output of code converter 17 is interrupted to prevent the input of further signals to the storage device, and the signal storing device 18 is being connected at intermittent intervals to the transmitter distributor 19. It is remembered that cam TD1 and TD2 operate in timed relation with cam TD3, and the condenser sets of the storage device 18 are prepared for connection to the transmitter in a given sequence, the connection of each condenser set as prepared by relays F and H being completed by relay J. The signal representing charges on the three sets of capacitors are thus layed upon the transmitter distributor 19 in a given sequence for retransmission to the distant station.

During the period that the stored signals are being transmitted, cam RD1 which operates in timed relation with cams TD1, TD2 and TD3 effects the intermittent operation of relay OR to effect the advancement of the counting chain comprising relays HA–HD inclusive, whereby relay ST and the chain are operative to maintain the associated tape control unit 22 and teleprinter 30 blocked for the predetermined time period.

That is, as the relay SX operates, it is effective at its contacts *sx* to prepare an operating circuit through the left hand winding of first chain relay HA, which circuit is completed with the operation of relay OR by cam RD1. This operating circuit for energizing relay HA and initiating the chain operations extends from negative battery over contacts or the left hand winding of relay HA, back contacts *hb*2, and front contacts *sx* to ground.

Relay HA operates, and at its contacts *ha*2 completes an energizing circuit for relay ST, the circuit extending from negative battery over the lower winding of relay ST, contacts *ha*2 and *hc*2 to ground. Relay ST operates, and at its contacts *st* interrupts a further point in the operating circuit for relay Z to maintain relay Z inoperative even though the relay SX restores prior to the transmission of the four signals (the warning signal and three stored signals). As will be shown, relay ST is maintained operated by the chain to maintain the relay Z inoperative for the period that the four subsequent signals are transmitted.

Relay HA in operating is effective at its contacts *ha*3 to interrupt the energizing circuit for the keying distributor 29 which extends over conductor 32 to thus prevent operation of the teleprinter 30 during the period that the stored signals are being transmitted (see Figure 3).

Relay HA at its contacts *ha*1 prepares a series energizing circuit to relay HB, which is arranged to be completed with the next operation of relay OR.

As cam RD1 in its cycle closes the operating circuit for relay OR, make contacts *or* are operated to complete the series energizing circuit extending over the right hand winding of relay HA and the left hand winding of HB to ground to effect the series operation thereof.

Relay HB operates, and at its contacts *hb*2 prepares a holding circuit for relay HA which extends from negative battery over the back contacts or the left hand winding of relay HA, contacts *hb*2 and *hd*2 to ground; and at its contacts *hb*1 prepares a series energizing circuit for relay HC.

As the cam RD1 continues in its cycle and relay OR restores, it is effective at its contacts *or* to complete a series operating circuit for relay HB and HC, the circuit extending from negative battery over back contacts *or*, *hb*1, the right hand winding of relay HB, and the left hand winding of HC to ground. Relay HA is held operated over the circuit extending from negativet battery over the left hand winding of relay HA, make contacts of *hb*2, and the break contacts of *hd*2 to ground.

Relay HC operates, and at its front contacts *hc*2 completes a direct holding circuit for relay ST, and at its contacts *hc*1 prepares a series energizing circuit for the fourth counting chain relay HD. At this time relays HA, HB and HC are in the operated position.

As cam RD1 continues in its cycle, and as relay OR again operates, it is effective at its make contacts *or* to complete the series energizing circuit for relays HC and HD, the circuit extending from negative battery over contacts *hc*1, the right hand winding of relay HC, and the left hand winding of relay HD to ground.

Relay HD operates, and at its contacts *hd*2 interrupts the holding circuit for relay HA, which restores; and at its contacts *hd*1 completes a self-holding circuit extending over its right hand winding contacts *or*; and at its contacts *hd*3 interrupts a further point in the energizing circuit extending over the blocking conductor 32 to the keying distributor 29 to maintain same inoperative.

As the cam RD1 continues its cycle, relay OR is restored, and is effective at its break contacts *or* to complete the holding circuit for relay HD through the right hand winding thereof, and at its front contacts *or* is effective to interrupt the series holding circuit for HC and HD. Relay HC restores, and at its make contacts *hc*2 interrupts the holding circuit which extends through the lower winding of relay HD, and at its break contact *hc*2 completes a restoring circuit for relay ST which extends over negative battery over cam RD1, the upper winding of relay ST, and break contacts *ha*2 and *hc*2 to ground.

Relay ST restores, and at its contacts *st* prepares the energizing circuit for relay Z (assuming no further mutilated signal has arrived) as controlled by cam TD3. As cam RD1 continues in its rotation and relay OR is again operated, break contacts *or* are operated to open the holding circuit for the fourth counting chain relay HD and effect the restoration thereof; relay HD restores, and at its contacts *hd*3 recompletes the energizing circuit, which extends over the blocking wire 32 to the keying distributor 29 to render same effective once more. Normal signal transmitting is now effected in the manner described heretofore.

It will be seen from the foregoing that signal repetition is effected without having to regenerate the code converter, as heretofore practiced, and without having to reoperate a series of code converter controlling relays. Accordingly, the delay in propagation time is reduced, and the possible percentage of error is minimized by reason of the elimination of several circuit operations. Finally, the simplicity of the circuit arrangement facilitates general circuit layout and a storage device which is operative to store the true transmitter output, rather than transmitter input, is accomplished.

The examples set forth hereinbefore are exemplary of the manner in which signals are transmitted over one channel in a system, whereas in practice a time-divided two channel system is conventionally employed. In the two channel systems all distributors are provided with more than seven sectors (in most cases fourteen) so that the two channels alternately having signals transmitted thereover are being scanned. The mutilation detector 28 in such arrangements must not be able to operate unless all the receiving relays at the input side of the code converter 27 have been operated in accordance with the received signal. Thus, the timing delay OR (Figure 2) at its contacts *or* is operative to interrupt the energizing circuit for the mutilation detector relay SX until the entire set has been received.

Figure 3 sets forth in diagrammatic form the manner in which signal transmission of a two channel path is effected. Assuming reception of either a warning signal (indicated in Figure 3 as signal 1) or a mutilated signal, the system will operate in the following manner:

(*a*) The energizing circuit for distributor control 31 which extends over blocking wire 32 is interrupted for a period of four signal lengths;

(*b*) The transmitter 21 is connected to transmit signal 1 (warning signal) immediately as the outgoing channel is connected for operation;

(*c*) The three signals stored on the signal storing device 18 are transmitted, and the circuit extending over blocking wire 24 to the tape control equipment 22 is interrupted to prevent interference with the signals on the signal storing device 18 as the transmission thereof is being effected;

(*d*) The signal transmitted out of the signal storing device 18 is registered thereon.

With reference to Figure 3, it is apparent that the representations thereat indicate that the equipment at station A is transmitting a telegram comprising a series of letters *a*, *b*, *c*, etc., and the equipment at station B is transmitting a telegram comprising the series of letters A, B, C, etc. The theoretical maximum time delay between transmitter A and receiver B is approximately the duration of transmission of one signal over both channels. Supposing now that the signal *a* as transmitted by station A is received in a mutilated condition at the receiver of station B, and that no multilation has taken place in the message transmission being effected in the direction B—A.

With the reception of mutilated signal *a* at the receiver of station B, the equipment is operative in the manner above described to prevent the printing thereof by the teleprinter 30, and is effective to block the teleprinter from printing the next three signals (whatever these signals may be). Simultaneously, it interrupts the transmission by its local transmitter of the character D (which would normally be transmitted at this time) and transmits in its place a warning signal (1). Immediately thereafter, the signals A, B, C are transmitted in that order, these being the signals that were stored on the storage device at station B. It is noted that these signals will be blocked from the teleprinter at station A. Further, the signals are reimposed on the storage device for use in the event that one of the signals A, B, C was mutilated in its original transmission. Assuming that the subsequent transmission of signals *a, b. c* is successful, no further repetition cycle is made at station B, and the traffic continues with signal D, and the following message being transmitted to station A in the manner which was being effected prior to detection of the mutilated signal.

At station A, the receiver will have controlled the teletype to print incoming signals A, B and C. At this time however, it will detect the warning signal which was transmitted by station B, and the detector 28 will condition the systems to retransmit the mutilated message. That is, the teleprinter 30 is blocked for four successive signal durations so that the printing of signal 1 (the warning signal) and the retransmitted signal A, B and C is prevented. Transmitter 21 is controlled to transmit a warning signal 1 followed by *a, b,* and *c* as stored on the storage unit. Signal 1 will arrive at station B during the period that the fourth signal duration of the repeating cycle is effective, and accordingly will not be registered on the equipment thereat. Signal *a* however, will be the first letter received at station B subsequent to expiration of the four signal blocking period thereat, and accordingly will be printed by its associated teleprinter 30. Assuming no further mutilations, the following signals *b, c, d,* etc. are printed as received.

A further more detailed description of the manner in which the two channel systems are operative, as set forth in my copending application, Serial No. 97,799, entitled "Printing Telegraph Systems," which was filed June 8, 1949.

While I have illustrated and described what I regard the preferred embodiment of my invention, nevertheless it will be understood that such is merely exemplary, and that numerous modifications and rearrangements may be made therein without departing from the essence of the invention.

I claim:

1. In a telegraph system of the class described which includes a code converting unit for converting code signals of a given number of elements into code signals having a larger number of elements a transmitter unit, a receiving unit and printing means for printing the incoming messages received by said receiver unit, a signal channel for connecting the output of said converter to said transmitter means, signal storing capacitors connected to said channel for registering each of said converted signals with their application to said transmitter over said channel, sequence control means for controlling said signal storage means to store a minimum number of signals which number is commensurate with the time required for propagation of the signal to remote receiver equipment and the return of a signal therefrom indicating that the received signal has been mutilated, and control means operative responsive to mutilation of one of said converted signals in transmission to said distant end to effect connection of the storage means to said channel and the reapplication thereby of said signal which was mutilated in transmission including means for transmitting a blocking signal to terminate the signal input to said converter means and simultaneously to terminate operation of said printer unit.

2. In a telegraph system of the class described having a code converting unit for converting code signals of a given number of elements to code signals having a larger number of elements and transmitting means, signal storage means for registering each of said converted signals as extended to said transmitting means, and control means operative responsive to mutilation of one of said converted signals during transmission to effect the re-application of said one signal as stored thereon to said transmitter means, including means controlled by the transmitter with transmission thereby of a stored signal to simultaneously transmit a like signal back to said storage means for repeated reapplication to said transmission line with repeated receipt of an indication of a mutilated signal.

3. In a telegraph system of the class described having a code converter unit for converting code signals having a given number of elements into code signals having a larger number of elements, an output circuit, signal transmitter means for transmitting signals thereover, and control means including distributor means for sequentially applying the elements of each output signal to said transmitter means, signal storage means, means for registering the elements of each of said converted signals on said storage means prior to transmission, means operative responsive to mutilation of one of said converted signals in transmission to effect disablement of said code converter means and connection of said storage means to said distributor to control same to effect the reapplication of the elements of each stored signal to said transmitter means, and charge restoring means controlled by said signal transmitter means to transmit back over said distributor member to said storage means a signal corresponding to the signal being transmitted over the output circuit.

4. In a telegraph system of the class described having a code converting unit for converting incoming code signals of a given number of elements to code signals having a larger number of elements, transmitter means, a signal channel arrangement comprising a plurality of conductors connected at the output side of said converter arranged to form individual paths for the plurality of elements of each converted signal to extend same to said transmitter, signal storage means for recording each of said converted signals as applied over said channels comprising a plurality of groups of signal storing capacitors, each group including as many capacitors as there are elements of the converted signal, whereby each capacitor of a group is adapted to store one element of the signal, distributor means for connecting said signal storing groups sequentially and cyclically to said channel conductors in timed relation with the application of the successively converted signals to said channel canductors, subsequent connection of said groups to said conductors as a new cycle of signals is applied to said channel effecting removal of the previous signal registered on the group and substitution of the newly applied signal thereon, receiver means, printer means for printing the signals received by said receiver means, and control means operative responsive to detection of a signal mutilated in transmission including means for disconnecting the conductors from the output side of said converter means for connecting said signal storage means to said conductors in cyclic manner to effect the application of the particular signals stored on said storing means at the time of detection of the signal mutilation means for blocking operation of said printer and means for interrupting the signal input to said converter for the period of transmission of the signals on said storage means.

5. In a telegraph system of the class described having a code converting unit for converting code signals of a five unit code to signals of a seven unit code, a signal channel arrangement comprising a plurality of seven conductors connected to the output side of said converter arranged to form individual paths for the seven elements of each converted signal, signal storage means for recording each of said converted signals as applied over said channel comprising three separate groups of signal storing capacitors, each group including seven capacitors for storing the seven elements of the signal as applied to said channel, distributor means for connecting each of said signal storing groups sequentially and cyclically to said conductors in timed relation with the application of the elements of the successively converted signals to said conductors, subsequent connection of said groups to said conductors as a new cycle of signals is applied to the channel effecting removal of the previous signal registered thereon and registration of the new signals, and control means including means operative responsive to the detection of a signal mutilated in transmission for disconnecting the conductors from said output side of said converter, means operative to connect said storage groups to effect the application to said conductors of the particular signals stored on said storing means, an outgoing circuit, and means for applying said stored signals to said outgoing circuit and simultaneously to said storage means for restorage thereby.

6. In a telegraph system of the class described having a code converting unit for converting code signals of a given number of elements to code signals having a larger number of elements, a signal channel arrangement comprising a plurality of conductors connected at the output side of said converter arranged to form individual paths for the plurality of elements of each converted signal, signal storage means for recording each of said converted signals as applied over said channels comprising a plurality of groups of signal storing capacitors, each group including as many capacitors as there are elements of the signal in its converted form, whereby each capacitor of a group is adapted to store one element of a signal as applied to said channel conductors, distributor means for connecting said signal storing groups sequentially and cyclically to said channel conductors in timed relation with the application of the successively converted signals to said channel, subsequent connection of said groups to said conductors as a new cycle of signals is applied to said channel effecting removal of the previous signal registered on the group and substitution of the newly applied signal, a signal relay, and an outgoing circuit, electronic control means for controlling said relay to transmit signals over said outgoing circuit, scanner means for connecting in sequence each of the signal channel conductors to said electronic means to effect corresponding operation thereof in the control of said signal relay, and control means operative responsive to detection of a signal mutilation in transmission to effect the application of the signals stored on said storing means to said channel conductors, and means including said electronic control means for reapplying said signals to said storage means during the period of transmission thereof by said signal relay.

7. In a system as set forth in claim 6 which includes timer means for effecting the transmission of three signals by said transmitter means over said communication link in a predetermined time period which is slightly greater than the total time lapse effected in propagation of the first signal, monitoring of that signal at the receiving point, the return of a warning signal in the event of detection of a signal mutilation, and the response of said control means to such warning signal, whereby the signal transmitted first in the recycling will be the signal which was mutilated in transmission.

8. A mnemonic transducer comprising a set of storage capactitors, input means operative to provide a varied potential to said capacitors in accordance with the nature of pre-determined information supplied thereto, electronic transmittter means, distributor means for successively connecting each of said information storing capacitors to said electronic transmitter for transmission of the information thereon over an interconnected communication link, and means controlled by the signal transmitter in its operation to transmit said information over said associated communication link operative to simultaneously transmit said information to the storage means for repeated storage thereon.

9. An arrangement as set forth in claim 8 in which said signal transmitter means comprises a pair of multielectrode tube structures having anode and grid cathodes interconnected to produce a circuit having two alternative states, one state being effected with one of said structures conductive and the other of said structures non-conductive, the other state being effected with the structures being in reverse order, the state of said tubes being controlled by the nature of the information transmitted to the tube structures by the storage means connected thereto and the nature of the information transmitted by the tube structures to the storage capacitors is determined by the particular state of the tube structures at the time of signal transmission by said signal transmitter.

10. A mnemonic transducer for recording a plurality of signals as applied over a given channel comprising a plurality of groups of signal storing capacitors, each group including a number of capacitors which is equivalent to the number of elements of each signal as applied to said channel, distributor means for connecting each of said signal storing groups sequentially and cyclically to said channel in timed relation with the application of elements of the incoming signals to said channel, the subsequent connection of said groups to said channel as a new cycle of signals is applied thereto effecting removal of the previous signal registered on the connected group and the registration of the new signal thereon, signal transmitting means, an outgoing circuit and signal regenerating means controlled by said transmitter means simultaneous with its transmission over said outgoing circuit of the information stored on a group to transmit a like signal to said group for storage.

11. In a telegraph system of the class described having a code converting unit for converting code signals of a given number of elements into code signals having a larger number of elements and means for transmitting same over an associated communication link, signal storage means connected intermediate said converter and said transmitter signal control means for registering each of said converted signals on said storage means simultaneous with transmission thereof to said transmitter means, sequence control means for controlling said storage means to register at any time at least one of the signals converted, means for terminating operation of said signal control means responsive to mutilation of a signal in transmission, and means for thereafter supplying said signals on said storage means to said transmitter unit.

12. In a telegraph system of the class described having a code converting unit for converting code signals of a given number of elements into code signals having a larger number of elements, transmitter means, signal storage means connected to the output side of said converter, signal control means operative to transmit each of said converted signals to said storage means and simultaneously to said transmitting means, sequence means for controlling said storage means to store each signal for a predetermined time following the transmission thereof by said transmitting means, and control means operative responsve to mutilation of one of said converted signals in transmission to effect disconnection of the storage means from said signal control means and transmission of the signal stored thereon to said transmitter means, and timer means for providing a predetermined time period for connection of the signal storage unit to said transmitter which is gauged to the time required for transmission of a given number of signals stored thereon.

References Cited in the file of this patent

UNITED STATES PATENTS

| | | |
|---|---|---|
| 1,997,683 | Hennig | Apr. 16, 1935 |
| 2,208,655 | Wright | July 23, 1940 |
| 2,518,405 | Van Duuren | Aug. 8, 1950 |